United States Patent Office 3,427,223
Patented Feb. 11, 1969

3,427,223
COAGULATING MICROBIAL CELLS TO
ENHANCE THEIR SEPARATION
John W. Frankenfeld, Atlantic Highlands, Robert P. Cahn, Millburn, and Philip Zaybekian, Parsippany, N.J., assignors to Esso Research and Engineering Company, a corporation of Delaware
No Drawing. Filed June 10, 1964, Ser. No. 374,141
U.S. Cl. 195—1   15 Claims
Int. Cl. C12d 13/06, 13/00; C12b 1/00

ABSTRACT OF THE DISCLOSURE

Coagulating microbial cells by adding to an aqueous effluent of a culture media either a cell nutrient containing acid or mixtures of the nutrient containing acid and a cell nutrient containing salt, sufficient to lower the pH of said effluent to a pH in the range of 2.0 to 6.0, thereafter heating said aqueous effluent for sufficient time to coagulate the cells and thereafter separating the coagulated cells from the effluent.

---

This invention is directed to a process for facilitating product recovery of microbial cells present in an aqueous effluent issuing from a biosynthesis bath wherein said cells are grown on carbohydrate or hydrocarbon feeds, and preferably $C_1$ to $C_{30}$ n-aliphatic hydrocarbon feeds containing less than 0.5 weight percent aromatics.

More specifically, this invention is directed to a continuous or batch process for the biosynthesis and recovery of microbial cells which comprises: producing the cells in a biosynthesis bath containing a source of carbon, hydrogen, oxygen and essential nutrients; withdrawing product microbial cells as an aqueous effluent from said biosynthesis bath; adding to said aqueous effluent a material selected from the group consisting of: (1) an essential cell nutrient containing acid and (2) mixtures of (1) with an essential cell nutrient containing salt, in sufficient amount to lower the pH of said effluent to a pH below that of said biosynthesis bath but above that at which the protein value of said cells is degraded; heating said aqueous effluent to a temperature above the cell growth temperature but below that at which significant protein degradation occurs; and thereafter separating said cells from said effluent to yield a cell component and a nutrient containing residuum, e.g. supernatant or filtrate. The nutrient containing residuum is then employed as nutrient for additional biosynthesis by feeding it to the biosynthesis bath. In addition and according to a preferred embodiment of this invention, a basic pH nutrient containing compound, and preferably one containing available nitrogen, is fed to said biosynthesis bath in amounts sufficient to maintain the pH thereof at a proper level for cell growth. Thus, the basic pH nutrient containing compound can be used to adjust any pH variance occasioned by feeding the acidic nutrient containing residuum to the biosynthesis bath, and thus insure maintaining proper growth pH throughout biosynthesis.

The present world shortage of protein, esp., low cost proteins, for consumption by animals and humans is well known. In an attempt to alleviate this protein shortage, recently there have been developed several biosynthesis procedures whereby living protein can be produced by the growth of bacteria or other microorganisms on various hydrogen and carbon containing substrate materials, especially those which are relativley inexpensive. One of the known techniques of biosynthesis involves growing various yeast, molds, algal or bacteria on carbohydrate substrates. However, this type of biosynthesis in addition to utilizing expensive feed stocks frequently requires the addition of expensive vitamins, amino acids and other growth mediums in order to insure the desired microorganism growth.

A recent and more promising technique for biologically synthesizing protein for food and other uses is the culture of microorganisms on petroleum hydrocarbon substrates. This latter type of protein biosynthesis is usually conducted in an aqueous biosynthesis bath containing a hydrocarbon feed media, an inoculant of the bacteria to be grown, and an aqueous growth medium in addition to oxygen and other indispensable nutrients and growth factors. This type of protein biosynthesis allows the use of petroleum feeds which are even less expensive than carbohydrates, and does not usually require expensive growth factors such as vitamins, amino acids, etc., to be supplied in order to insure proper microorganism cell growth.

One serious drawback to the wide acceptance of these protein biosynthesis techniques, esp., when hydrocarbons are employed as a predominate feed media, resides in the fact that the product microorganism cells, esp. in the case of certain bacteria cells, are often of very small size, e.g. from 0.5 to 5.0 microns and even smaller. With such small sized microorganism cells it is difficult and often very expensive to achieve recovery of the product microorganism cells. One factor leading to increased expense in recovering product microorganism cells is the difficulty in separating the cells from the aqueous product stream containing them where the cells are present in low concentrations, e.g. 1 to 5 wt. percent. Another salient factor which increases recovery expense is the required removal of comparatively large amounts of water attracted to and maintained by the cells, including interstitial water present in the cell walls of the microorganisms. Still another cost increasing factor resides in the apparent necessity to pasteurize the cells, viz., render them essentially nonviable. These and other related factors serve to increase the overall cost of recovering the grown microorganisms. Separation and dewatering, e.g. drying, procedures can amount to as much as 25% or higher of the total cost of producing the microorganisms in a form suitable for use in high protein foods or food supplements. Hence, it will be realized that any substantial improvement in effecting dewatering of microorganism cells esp., those having very small cell diameters, prior to separation and drying will result in significant economic savings and thus reduce the overall cost of producing high protein foods and food supplements.

The present invention constitutes a marked improvement in accelerating and facilitating product recovery and dewatering of microbial cells by rapidly coagulating the cells prior to separating them from the product containing effluent stream. According to certain preferred embodiments of the this invention, the rate at which the microbial cells can be separated from the remainder of the product stream can be accelerated by as much as 20 fold or even higher, thus attaining substantial economies in time and equipment necessary for conducting the separation procedure on a given volume of product stream. The substantial reduction in the time required for separation and drying of the cells is usually applicable regardless of what separation technique is employed. For example, substantial savings in the time and equipment required for effecting separation and dewatering of microbial cells can be achieved using any of the conventional cell separation techniques, e.g., filtration, centrifugation, settling, etc. Another atttendant advantage of this invention is that it allows the same separator and drying apparatus to treat a much larger volume of product containing aqueous effluent stream within a given period of time than could be handled previously. For example, when the speed of filtration is increased by a factor of four fold according to this invention; the filtration apparatus can handle four times the volume of product containing aqueous effluent than could be filtered in the same given time period without using this invention. Similar economies of time and efficiency in utilization of separation apparatus are achieved when the separation procedure is conducted by centrifugation.

These and other advantages of the present invention will become apparent from the description which follows.

The effluent stream containing microbial cells is withdrawn from the biosynthesis bath. The pH of the product stream effluent is then lowered by addition of a nutrient containing acid or acid plus salt. The term "nutrient containing" as employed herein with reference to the acid(s) and salt(s) is employed in a dual meaning in that the material in question must not only contain a cell nutrient, but also must be free from a component(s) which are detrimental to cell growth and reproduction. Hence, acids or salts having a poisonous effect on the microorganisms being harvested must be avoided. Then the acidified effluent is heated prior to passing it through a separator which separates the microbial cells from the remaining portion of the acidified effluent.

The cells are withdrawn from the separator and subjected to drying to produce the dried product microbial cells. The remaining portion of material coming from the separator, viz., the filtrate or supernatant containing the previously added nutrient acid is then recycled back into the biosynthesis bath.

Prior to or after feeding the nutrient acid containing filtrate or supernatant back to the biosynthesis bath, its pH is raised to a level closely approximating that maintained for cell growth in the biosynthesis bath. This can be accomplished by addition of a basic pH compound containing an essential cell nutrient to the filtrate or supernatant prior to recycling it to the biosynthesis bath. The nutrient contained in the basic pH compound can be the same or different from that contained in the acidic material. Usually, however, the nutrient contained in the base is different from that in the acid. Preferably both nutrients are ones required in comparatively large amounts for cell growth, e.g. phosphorus and nitrogen. Instead of neutralizing the pH of the acid filtrate or supernatant prior to recycling it to the biosynthesis bath, it can be added directly to the biosynthesis bath without neutralization. However, in the latter case, the basic pH nutrient containing compound is added to the biosynthesis bath to neutralize any excess acidity due to the recycled nutrient containing acid to thereby raise the pH of the acidified supernatant or filtrate to a value favorable for cell growth in the biosynthesis bath. The specific pH maintained in the biosynthesis bath will be determined largely by the favored growth pH of the particular microorganisms being grown in the biosynthesis bath, and it is this target pH which is closely approximated by bringing about neutralization of the previously acidified filtrate or supernatant using, e.g., either of the two neutralization techniques set forth hereinabove. Moreover, neutralization is conducted on a fairly continuous basis to neutralize the organic acids produced by the microorganisms as a by-product of biosynthesis.

The biosynthesis bath is initially established by providing an inoculant of the microorganisms desired to be grown, water and oxygen; and supplying to this inoculant a feed mixture containing the hydrocarbons or carbohydrates which serve as the source of carbon and hydrogen for the microorganisms, an oxygen containing gas, and an aqueous growth medium containing essential cell nutrients for growth and multiplication of the microorganism cells. The product cell-containing aqueous effluent stream from the biosynthesis bath, which is subjected to coagulation treatment can be an aqueous slurry or an aqueous froth product stream. That is to say that the cells can be concentrated in the aqueous effluent by froth flotation either in the biosynthesis bath, itself, or after removal therefrom and prior to acidification and heating to coagulate them. Of course, the use of froth flotation prior to coagulation can be omitted and is not essential to this invention.

Upon removal from the biosynthesis bath, the aqueous effluent containing the microorganism cells is acidified to lower the pH thereof to a pH ranging from about 2.0 to about 6.0. Usually for most microorganisms, viz., bacteria and yeasts, the pH of the biosynthesis bath effluent stream is lowered to a pH ranging from 2.5 to 5.5, and more preferably from about 2.7 to about 4.5.

The nutrient containing acid, employed to effect the acidification can be any inorganic or organic acid which contains an essential cell nutrient in readily available form for assimilation by the cells being grown. Exemplary nutrient containing acids which can be used in accordance with the process of this invention to coagulate microbial cells to be used as food or feed supplement include, but are not limited to, the following: phosphoric acid; orthophosphoric acid; metaphosphoric acid; pyrophosphoric acid; acetic acid; propionic acid; butyric acid; lower alkyl substituted phosphinic acids, e.g., methyl phosphinic acid; orthophosphorous acid; metal phosphorous acid, hydrochloric acid; sulphuric acid; nitric acid; mixtures of any two or more of the above-mentioned acids; etc.

Suitable mixtures of nutrient containing acids and salts can be used, e.g. $CaCl_2$ plus phosphoric acid, NaCl plus phosphoric acid, NaCl plus acetic acid, $CaCl_2$ plus NaCl plus phosphoric acid, $CaCl_2$ plus acetic acid; etc. Moreover, a mixture of a calcium containing salt, e.g., $CaCl_2$, and a phosphorus containing acid, e.g., phosphoric acid, in proper proportion to maintain the proper $Ca:PO_4$ balance in the microorganism cells to be used as feed can be employed. The $Ca:PO_4$ ratio of the cells should range from 1 to 2:1 and preferably be at or closely approximate to 2:1 in order to enhance the calcium to phosphate balance of the non-viable microorganism feed.

When a biosynthesis procedure is conducted for nonfeed purposes, e.g. to produce intracellular and extracellular organic esters, acids and other chemicals, and especially in batch biosynthesis procedures; other acids and/or acid salts can be used to effect coagulation, e.g., trichloro acetic acid, $ZnCl_2$, $SnCl_2$, $AlCl_3$, etc.

Of the acids listed above, phosphoric acid is the preferred acid as phosphorus is an essential microorganism cell nutrient which is added in fairly large amounts compared to other essential inorganic nutrients. Moreover, it has been discovered that the addition of phosphoric acid to the product containing effluent stream constitutes a highly advantageous and efficient way of adding the make-up phosphorus to the biosynthesis bath, upon feeding (recycle of) the acid containing filtrate or supernatant from the separation step to the biosynthesis bath. In effect, the addition of the phosphoric acid according to this invention enables it to serve two useful purposes, one being to coagulate bacteria cells and the other to serve as make-up phosphorus for the biosynthesis bath. Moreover, there is no necessity to specially treat the separated and/or dried cells to remove any absorbed nutrient acid therefrom as it contributes to the nutritional value thereof.

After addition of the nutrient containing acid, the acidified effluent is preferably heated. The heating is conducted at a temperature above the growth temperature maintained in the biosynthesis bath yet below the temperature at which cell degradation occurs (protein degradation). Temperatures can be used which cause protein denaturation as long as no degradation of food value occurs. The heating is continued for a sufficient period of time to attain substantial coagulation of cells. The use of heating after acidification but before cell separation is preferred as it contributes substantially to cost reductions and efficiency. One advantage noted is a substantial improvement in acceleration of the rate at which cell separation can be conducted; and this improvement is specially pronounced in an area of difficult cell separations, viz., where the individual cell size is about one to two microns or below. Another important advantage is the attainment of more cell solids, viz., less residual water, in the separated cells. This reduces the cost of drying the separated cells, and drying is usually regarded as the most expensive step in cell recovery. Still another advantage resides in the partial sterilization of the microorganism cells. In this context, cells can be rendered partially non-viable with the use of substantially lower pasteurization temperatures in the acidified aqueous effluent stage.

As mentioned hereinabove, the acidification and heating should not be to such an extent as to degrade the microorganism cells. The terms "cell degradation," "degrade the microorganism cells," etc., as used herein are employed in reference to the molecular breakdown of cell protein and essential amino acids into lesser molecular weight and/or nutritionally less desirable by-products, e.g. by acid hydrolysis thereof, which by-products are not capable of contributing to the protein and/or amino acid nutritional value of the non-viable microorganism cells or other nutritionally valuable products contained in the cells.

In order to avoid degradation of cells during the coagulation step, the temperatures to which the acidified effluent is heated are usually controlled to range from a temperature about 10° C. above the growth temperature maintained in the biosynthesis bath up to a temperature below that at which cell degradation occurs, e.g., a temperature of approximately 100° C. or even below. The exact upper and lower temperatures will vary depending upon the specific microorganism being grown. Usually, the acidified effluent is heated to a temperature ranging from about 45° to about 90° C. for a time period ranging from 1 to 30 minutes, and more preferably from about 1 to 20 minutes. For example, heating times of 1 to 15 minutes at temperatures ranging from about 50° to about 85° C. usually yield excellent coagulations for most bacterial cells, including *Micrococcus cerificans*.

In the case of most bacteria cells, it is usually advisable to acidify the product effluent stream issuing from the biosynthesis bath to a pH ranging from about 2.5 to about 5.5. For example, the pH of the bacteria cell containing aqueous effluent is lowered to a pH ranging from about 3.0 to about 4.5 when *Micrococcus cerificans* bacteria cells are being coagulated.

Subsequent to the coagulation step, the aqueous effluent containing the product bacteria cells is passed to a suitable separator device, e.g., a filter or centrifuge to effect separation of the microorganism cells from the remainder of the effluent. The thus separated cells can then be passed to any suitable drying device, e.g., a spray drier utilizing heated gases to effect cell drying and render them completely non-viable. The dried product cells can then be used as a food supplement. However, drying of the cells is not mandatory as these separated cells can either be employed directly for non-food uses, e.g., in recovering intracellular chemicals such as esters therefrom, or they can be rendered non-viable by procedures other than drying and then used as feed supplements.

When the biosynthesis is conducted to produce protein rich microorganisms for feed purposes, the cells are rendered completely non-viable prior to such usage. Usually the cells are killed by heating, in spray driers at the appropriate temperatures for the requisite time periods. The specific temperatures and times used in any given situation will depend on the specific microorganism being killed, the extent of pasteurization desired, etc.

The killing temperatures can range from 150 to 450° F. for time periods of from about 1 second to 2 hours with the shorter time periods being employed at the higher temperatures and vice versa. Usually temperatures of 240° F. to 380° F. and time periods ranging from 5 seconds to 15 minutes are satisfactory to render most bacteria completely non-viable. Superatmospheric pressure, e.g., 2 to 50 atmospheres, can be and usually is employed when pasteurization is conducted using the lower temperatures, e.g., 240°–250° F., and the accompanying time periods.

When the microorganism cells are to be used as a feed supplement, care should be exercised to avoid using such high temperatures as will degrade the cell protein. For example, when *Micrococcus cerificans* cells are grown and harvested for use as feed supplement, the pasteurization temperatures range from about 280° F. to 350° F. for time periods of from about 5 seconds to about 90 seconds. As mentioned above, the exact pasteurization temperature-time schedule will vary depending upon the specific microorganism being rendered non-viable.

The filtrate or supernatant contains the added nutrient containing acid or salt and is recycled back into the biosynthesis bath with or without prior neutralization with a basic pH nutrient containing compound.

Whether the basic pH nutrient containing compound is added to the aqueous supernatant prior to, simultaneous with or after recycling thereof back into the biosynthesis bath, it is preferable to use a basic pH compound containing nitrogen in available form for ready assimilation by the microorganisms being grown. Such a nitrogen-containing basic pH compound can be organic or inorganic. Suitable exemplary nitrogen containing basic compounds include, but are not limited to, the following: nitrate salts, e.g., $NaNO_3$; ammonia; ammonium hydroxide; ammonium salts, e.g., ammonium nitrate, diammonium phosphate; urea; purine; asparagine; etc.

According to a preferred embodiment of this invention, the source of carbon and hydrogen for cell growth is a $C_1$ to $C_{30}$ hydrocarbon feed containing less than 0.5 wt. percent aromatics. The aromatics content of below 0.5 wt. percent applies only in cases where the biosynthesis is conducted to grow cells for food usage. These $C_1$ to $C_{30}$ hydrocarbons include: $C_1$ to $C_5$ gaseous paraffins, e.g., methane, ethane, propane, etc., and gases containing them; $C_6$ to $C_{10}$ light naphthas viz, low boiling hydrocarbon oils of the $C_nH_{2n+2}$ series having a boiling point of from about 95° to 150° C., and petroleum fractions containing them; and $C_{11}$ to $C_{30}$ gas oils boiling in the range of approximately 190° to 320° C., and petroleum fractions containing them. When the microorganisms are grown on methane or other gaseous paraffin feeds, suitable classes of microorganisms are Pseudomonads, Nocardia and Mycobacterium, including the following exemplary species: *P. methanica, N. corallina* and *M. paraffinicum*. When the biosynthesis is conducted using a light naphtha feed, a suitable class of microorganisms is Pseudomonads, typical examples of which are: *P. fluorescens, P. desmolyticum* and *P. aeruginosa*. In a preferred embodiment, the biosynthesis is conducted using a bacteria inoculant, but yeasts can be employed, e.g., Rhodotorula, Candida, Hansenula, etc. According to a preferred embodiment of this invention the hydrocarbon feed is a $C_{11}$–$C_{30}$ paraffinic hydrocarbon feed containing a predominate weight concentration of n-hexadecane and having less than 0.1 wt. percent aromatics. The aromatics are removed from the $C_{11}$–$C_{30}$ paraffins prior to feeding it to the bacteria inoculant. In place of using a mixture of $C_{11}$ to $C_{30}$ paraffins having a predominant weight concentration of n-hexadecane, concentrated or essentially pure n-hexadecane can be used to grow aerobic gram negative coccus bacteria cells. Preferred bacteria are as follows: *Micrococcus cerificans, Pseudomonas aeruginosa, Pseudomonas fluorescens, Nocardia opaca* and *Nocardia rubra*. Especially preferred bacterium is *Micrococcus cerificans*, isolated and identified by Dr. R. E. Kallio et al., Journal of Bacteriology, volume 78, No. 3, pages 441–448 (September 1959). Cultures of this organism have been deposited in the American Type Culture Collection, 212 M St., NW., Washington 7, D.C., as No. 14,987. The full identification of this material is as follows:

Morphology: cells are small, spherical, tending to be elliptical in old cultures and in media high in nitrogen. Cells from defined media average 0.5 to 1.0 micron in diameter and from complex media 1.0 to 2.0 microns in diameter. Cells occur singly or in clumps. Immotile, Metachromatic granules and sudanophilic granules are not observed.

Gram reaction: negative.

Colonies on defined agar are small (1 mm.), circular, convex having entire edge. Colonies on nutrient agar are larger (2 to 5 mm.), raised mucoid, generally round.

Pigmentation: white, beige or tan variants occur.

Obligately aerobic: a wide variety of materials support growth: yeast extract, casein hydrolyzate, long-chain alcohols and acids, long-chain normal alkanes and olefins.

Carbohydrate fermentation: No carbohydrates are fermented. Aerobically, many carbohydrates are assimilated. These include glucose, maltose, mannitol, sucrose, lactose, arabinose, rhamnose, sorbital, dulcitol, and inulin. Aerobically, glucose is utilized with acid production. Gluconic acid has been identified.

Nitrate reduction: negative.

Gelatin liquefaction: generally negative. Slow liquefaction may occur in some strains.

Urea hydrolysis: positive.

Catalase is produced.

Hydrogen is not utilized..

Optimum temperature is 25° C.

Optimum growth pH is 7.0 to 8.5.

Source: Iowa soil.

Habitat: soils.

Recent experimental information secured in the laboratories of the present inventors leads to the conclusion that the designation *"Micrococcus cerificans"* may be inaccurate and that the said *Micrococcus cerificans* would be more correctly called an "Arthrobacter," and indeed does closely resemble *"Arthrobacter ureafaciens."* The following reasons are indicative of the above conclusion concerning the nomenclature of *"Micrococcus cerificans"* as more properly classifiable as an Arthobacter.

| Micrococcus | *Micrococcus cerificans* | Arthrobacter |
|---|---|---|
| Always gram positive early in fermentation. | Always gram neg. | Gram neg. or variable |
| Cells in irregular masses. | Like Arthrobacter. | Short filament formation. |
| Never change size. | do | May occur with some rudimentary budding. |
| Never occur in a rod state. | do | Larger than usual coccoid cells may appear at times. Large coccoid cells give rise to rod shaped cells. |
| Carbohydrates frequently fermented. | do | Little or no acid from carbohydrates. |

The present invention will be more clearly understood from a consideration of the specific examples which follow.

EXAMPLE 1

*Micrococcus cerificans* is continuously grown in an aqueous biosynthesis bath containing 1.0 weight percent n-hexadecane (Matheson Practical Grade n-hexadecane) as the hydrocarbon feed media.

A 7.5 liter biosynthesis reactor vessel is charged with a 4 l. aqueous slurry containing 1.0 weight percent *Micrococcus cerificans* bacteria as inoculant. Sufficient air is bubbled through the inoculant slurry to satisfy the bacterial oxygen demand prior to introducing the hydrocarbon and inorganic salts growth feeds (the latter containing phosphoric acid and ammonium hydroxide). A typical biosynthesis bath composition at a given typical stage of a continuous biosynthesis campaign is as follows:

| Component: | Grams/liter |
|---|---|
| n-Hexadecane | 10 |
| $H_3PO_4$ | 5 |
| KCl | 1 |
| $CaCl_2$ | 0.5 |
| $MgSO_4 \cdot 7H_2O$ | 0.2 |
| $MnSO_4 \cdot 4H_2O$ | 0.2 |
| $FeSO_4 \cdot 7H_2O$ | 0.2 |
| NaCl | 0.2 |
| $NH_4OH$, sufficient amount added to maintain pH at 7.0. | |

The biosynthesis bath growth temperature is maintained at 35° C. (95° F.), plus or minus 2° C., and the pH of the biosynthesis bath is maintained essentially neutral, viz., at a pH of 7.0, plus or minus 0.1, throughout biosynthesis. The conversion of hydrocarbon feed to cells is maintained at 90 percent and higher. After a residence time of approximately 2 hours, a product stream aqueous slurry is continuously withdrawn from the biosynthesis bath. Typical 100 millimeter samples of this product stream aqueous slurry, containing approximately 1 percent by weight of bacteria cells, along with unconverted hydrocarbon, inorganic salts, nutrients, etc., are withdrawn at varying stages of a biosynthesis campaign. These samples are divided into four groups for further processing.

One group of samples, Group 1, are filtered directly without coagulation pretreatment. Another group of samples, Group 2, are acidified to a pH of 3.5 by addition of phosphoric acid prior to filtering. Another group of samples, Group 3, are acidified to a pH of 3.5 by the addition of phosphoric acid and then heated at a temperature of 85° C. (185° F.) for 15 minutes prior to filtering. The remaining group of samples, Group 4, was heated at 85° C. for 15 minutes but not acidified prior to heating and filtering.

Following this all samples are gravity filtered through the same filter, viz., 11 cm. fluted Whatman #1 filter paper. The average rates of filtration for the samples of each group are tabulated hereinbelow in Table I.

TABLE I

| Group | Acid Treatment | Heat Treatment | pH at time of Filtration | Temperature at Time of Filtration (° C.) | Filtration rate (Milliliters/Minute) |
|---|---|---|---|---|---|
| 1 | No | No | 7.0 | 25 | 0.53 |
| 2 | Yes | No | 3.5 | 25 | 2.22 |
| 3 | Yes | Yes | 3.5 | 85 | 10.00 |
| 4 | No | Yes | 7.0 | 85 | 0.16 |

As will be noted from the above data, the present invention enables the atainment of filtration rates approximately 19 times faster (Group 3) than when no coagulation treatment is conducted.

Following filtration, the phosphoric acid containing filtrate is recycled back to the biosynthesis bath to supply make-up phosphorus. The pH of the biosynthesis bath is controlled to maintain a pH of approximately 7.0 continuously by addition of ammonium hydroxide when needed.

EXAMPLE 2

*Micrococcus cerificans* cells are grown as in Example 1 to yield an aqueous slurry product stream containing approximately 1 percent by weight cells. Typical 100 milliliter samples of this product stream are withdrawn and divided into five groups for various coagulation treatments in accordance with this invention. Phosphoric acid was used to bring the pH of all samples to 3.5, and the samples of each group were then heated for 15 minutes at the temperatures noted below in Table II. The samples of each group were then gravity filtered as in Example 1 to yield the average filtration rate as noted in Table II.

TABLE II

| Group | Temperature (° C.) | Filtration Rate (mls./minute) |
|---|---|---|
| 1 | 50 | 2.54 |
| 2 | 60 | 3.9 |
| 3 | 70 | 4.7 |
| 4 | 80 | 5.1 |
| 5 | 85 | 10.0 |

EXAMPLE 3

(Variation of pH without adequate heating)

*Micrococcus cerificans* cells are grown in Example 1 to yield an aqueous slurry product stream containing approximately 1 percent by weight cells. Typical 100 milliliter samples of this product stream are withdrawn and divided into five groups for filtration. None of the samples are heated, but instead all samples are filtered at a temperature of 25° C. (77° F.) using gravity filtration as in Example 1. This temperature is approximately 10° C. below the growth temperature maintained during biosynthesis. The pH of the samples in each group was adjusted using phosphoric acid to yield the pH values recorded in Table III below. Despite wide variance in pH the filtration rates attained were slower than secured when adequate heating was used following filtration.

TABLE III

| Group | pH at time of filtration | Filtration rate (ml./min.) |
|---|---|---|
| 1 | 2.0 | 0.42 |
| 2 | 3.0 | 1.7 |
| 3 | 3.5 | 2.2 |
| 4 | 4.0 | 1.25 |
| 5 | 5.0 | 0.63 |

EXAMPLE 4

*Micrococcus cerificans* cells are grown as in Example 1 to yield an aqueous slurry product stream containing approximately 1 percent by weight cells. The product stream is then divided into two sample groups. The Group 1 sample is acidified to a pH of 3.5 using phosphoric acid followed by heating at 85° C. for 15 minutes. The Group 2 sample is neither acidified nor heated.

The Group 1 and Group 2 samples are then centrifuged at varying feed rates as noted below in Table IV using a Sharples "Super Centrifuge" at 18,000 revolutions per minute for 10 minutes. The pertinent data for this run is summarized in Table IV.

TABLE IV

| Group | Percent Unsedimented at $10^6$ O/E [1] | | | Compaction (Percent Solids in Cake) |
|---|---|---|---|---|
| | 0.1 | 4 | 6 | |
| 1 | N.D. | 2 | 3 | 27 |
| 2 | 8 | 20 | 40 | 10–15 |

[1] O/E=Volumetric centrifuge feed rate divided by effective settling area of Sharples "Super Centrifuge."
N.D.=Not determined.

As will be noted from the above data, the Group 1 sample aqueous product containing slurry, which was treated in accordance with this invention prior to centrifuging, yielded far superior results than the Group 2 sample which was untreated prior to separation of the cells by centrifugation.

EXAMPLE 5

*Micrococcus cerificans* cells are grown as in Example 1 to yield an aqueous slurry product stream containing from 1 to 2 percent by weight cells (dry basis). Equal 25 cubic centimeter samples of the product stream are then divided into two groups for treatment in accordance with this invention. Both groups are acidified at room temperature and then heated at 150°–200° F. for from 15 to 30 minutes just prior to filtration. The samples of Group 1 are acidified using a mixture of phosphoric acid and NaCl to the pH values noted in Table V below. Each sample in Group 1 contained 0.04 percent by weight NaCl (based on total sample) plus sufficient phosphoric acid to establish the various pH values listed in Table V below. The samples of Group 2 are acidified using a mixture of phosphoric acid and $CaCl_2$ (0.04% by weight based on total sample) with enough phosphoric acid to attain the varying pH values noted in Table V for Group 2. Then these 25 cc. samples are gravity filtered at atmospheric pressure using the same filter paper for all samples. The average filtration times for each sample are tabulated hereinbelow.

TABLE V

| Group | pH at Filtration | Filtration time (mins.) |
|---|---|---|
| 1 | 2.0 | 60 |
| 1 | 2.9 | 14 |
| 1 | 3.2 | 7 |
| 1 | 3.3 | 7 |
| 1 | 3.4 | 7 |
| 1 | 3.5 | 7 |
| 1 | 3.6 | 7 |
| 1 | 3.8 | 12 |
| 2 | 2.5 | 90 |
| 2 | 2.9 | 50 |
| 2 | 3.0 | 36 |
| 2 | 3.2 | 7 |
| 2 | 3.3 | 7 |
| 2 | 3.4 | 7 |
| 2 | 3.5 | 7 |
| 2 | 3.6 | 10 |
| 2 | 4.0 | 30 |
| 2 | 7.0 | [1] >60 |
| Untreated | | |

[1] At the end of one hour only one-fifth of the 25 cc. sample passed through the filter paper.

The above data indicates that the benefits of reduced filtration time are attainable in accordance with this invention using a mixture of a nutrient containing acid and a nutrient containing salt as an alternative to the use of a nutrient containing acid alone. In both Groups 1 and 2 the essential cell nutrient is phosphorus (as phosphate). In Group 1, the nutrients present in the salt are Na+ and Cl− and in Group 2, the salt nutrients are Ca++ and Cl−. The filtrate containing these respective nutrients can then be used as make-up nutrients by recycling the filtrate back to the biosynthesis bath whether the biosynthesis is conducted continuously or batch-wise.

EXAMPLE 6

*Micrococcus cerificans* cells are grown as a 1–2 percent by weight aqueous product containing slurry in accordance with Example 1 but to be used as a source of intracellular esters and other chemicals contained therein. The aqueous product stream was divided into seven typical groups for testing the comparative effectiveness of various coagulants. The coagulant was added to each sample and each sample was then heated for 10–30 minutes at 150–200° F. (steam bath temperatures) just prior to filtration. The same filter paper was used to filter all samples. The coagulants along with their comparative rating for effectiveness in coagulating the cells are tabulated below in Table VI.

TABLE VI

| Coagulant | Concentration [1][2] | Effectiveness |
| --- | --- | --- |
| $H_3PO_4$ | pH 3.2–3.6 | Excellent. |
| $H_3PO_4$-NaCl | 0.04 wt. percent NaCl; pH 3.2–3.6 | Do. |
| $H_3PO_4$-$CaCl_2$ | 0.04 wt. percent $CaCl_2$; pH 3.2–3.7 | Do. |
| Acetic acid-NaCl | 0.04 wt. percent NaCl; 2.0 wt. percent acid. | Good. |
| HCl | pH 3.1–3.4 | Do. |
| Acetic acid | 2.0 wt. percent | Fair. |
| No treatment | (pH=7.0) | Very poor. |

[1] The reported weight percents are those based on total sample.
[2] Sufficient acid was employed to establish the reported pH.

An additional but less preferred feature of this invention involves the use of calcium chloride followed by heating to coagulate microorganism cells. This facet of the present invention differs from the use of a nutrient containing acid either alone or in conjunction with $CaCl_2$ in that when calcium chloride is employed without acid, the pH can be neutral, slightly acidic or even slightly basic (as is frequently the case when commerical $CaCl_2$ is used due to basic contaminants in the $CaCl_2$ salt, e.g. $Ca(OH)_2$); yet the benefits of coagulation are substantially achieved when $CaCl_2$ is added to the aqueous product cell containing effluent stream followed by heating at temperatures ranging within those referred to hereinabove with respect to the use of nutrient containing acids. This unusual coagulation behavior of calcium chloride in this regard is not entirely understood; but it is apparently independent of pH, and therefore due to some phenomena other thean acidic pH value. A fairly wide range of $CaCl_2$ concentration can be used to effect cell coagulation. The $CaCl_2$ concentration can range from 0.01 to 10.0 percent by weight (based on total aqueous effluent), usually ranges from 0.04 to 5.0 weight percent, and preferably ranges from 0.05 to 3.0 weight percent.

While the above examples illustrate certain preferred embodiments of this invention, it is to be understood that the invention in its broadest aspects is not necessarily limited to the specific coagulants, temperatures, processing times, etc., as set forth in the examples.

What is claimed is:

1. A process for the biosynthesis and recovery of protein-containing microbial cells which comprises: producing microorganism cells in an aqueous biosynthesis bath comprising an inoculant of microorganism cells, a source of both carbon and hydrogen, and separate sources of oxygen and essential cell nutrients; withdrawing an aqueous effluent-containing product microbial cells from said biosynthesis bath; adding to said aqueous effluent a material selected from the group consisting of: (1) an essential cell nutrient containing acid and (2) mixtures of (1) with an essential cell nutrient containing salt, in sufficient amount to lower the pH of said effluent to a pH in the range from about 2.7 to 4.5; thereafter heating said aqueous effluent to a temperature above the cell growth temperature but below that at which significant protein degradation occurs for a sufficient period of time to substantially coagulate said cells; and thereafter separating said coagulated cells from said effluent to yield a cell component and a nutrient containing residuum.

2. A process according to claim 1 which includes feeding said nutrient-containing residuum as nutrient for said biosynthesis.

3. A process according to claim 2 which includes adding a basic pH compound containing a nutrient for said cells to said biosynthesis in amounts sufficient to maintain the pH of said biosynthesis bath at a proper level for cell growth.

4. A process according to claim 1 wherein said inoculant microorganism is *Micrococcus cerificans*.

5. A process according to claim 3 wherein said nutrient contained in said acidic material is phosphorus and said nutrient contained in said basic pH compound is nitrogen.

6. A continuous process for the biosynethesis and recovery of protein-rich microbial cells which comprises continuously producing microorganism cells in an aqueous biosynthesis bath comprising an inoculant of microorganism cells, a source of both carbon and hydrogen and separate sources of oxygen and essential cell nutrients; continuously withdrawing an aqueous effluent containing product microbial cells from said biosynthesis bath; adding to said aqueous effluent a material selected from the group consisting of: (1) an essential cell nutrient containing acid and (2) mixtures of (1) with an essential cell nutrient containing salt, in sufficient amount to lower the pH of said effluent to a pH ranging from 2 to 6; thereafter heating said acidified effluent at a temperature ranging from about 45° to about 90° C. but below that at which significant protein degradation occurs for a sufficient period of time to substantially coagulate said cells; separating said coagulated cells from said effluent to yield a cell component and a residuum containing said nutrient; and feeding said nutrient containing residuum to said biosynthesis bath.

7. A process according to claim 6 which includes heating said separated cells to render them non-viable.

8. A process according to claim 6 wherein the pH of said acidified effluent before heating ranges from 2.5 to 5.5.

9. A process according to claim 6 which includes adding to said biosynthesis bath a basic pH compound containing nitrogen in available form for assimilation by said microorganisms to continuously maintain the pH of said biosynthesis bath at a proper level for growth of said microorganisms.

10. A process according to claim 6 wherein said inoculant microorganism is *Micrococcus certificans*.

11. A process according to claim 9 wherein said nutrient contained in said acidic material is phosphorus.

12. A process according to claim 9 wherein said nitrogen containing basic pH compound is ammonium hydroxide.

13. A process according to claim 10 wherein the pH of said acidified effluent before heating ranges from 2.7 to 4.5.

14. A process according to claim 11 wherein said phosphorus containing acidic material is phosphoric acid.

15. A process for the biosynthesis and recovery of protein-containing microbial cells which comprises: producing microorganism cells in an aqueous biosynthesis bath comprising an inoculant of microorganism cells, a source of both carbon and hydrogen, and separate sources of oxygen and essential cell nutrients; withdrawing an aqueous effluent-containing product microbial cells from said biosynthesis bath; adding calcium chloride to said aqueous effluent; thereafter heating said aqueous effluent to a temperature above the cell growth temperature but below that at which significant protein degradation occurs for a sufficient period of time to sustantially coagulate said cells; and thereafter separating said coagulated cells from said effluent to yield a cell component and a calcium containing residuum.

References Cited

UNITED STATES PATENTS

| | | | |
| --- | --- | --- | --- |
| 2,790,790 | 4/1957 | Klostergaard | 260—112 |
| 3,193,390 | 7/1965 | Champagnat et al. | 195—34 |
| 3,252,961 | 5/1966 | Rodgers et al. | 260—112 |
| 3,264,196 | 8/1966 | Filosa | 195—34 |

A. LOUIS MONACELL, *Primary Examiner.*

N. ROSKIN, *Assistant Examiner.*

U.S. Cl. X.R.

195—3, 96; 99—9; 195—3